United States Patent [19]

Sardisco et al.

[11] 4,268,492
[45] May 19, 1981

[54] PROCESS FOR PRODUCTION OF POTASSIUM SULFATE AND HYDROCHLORIC ACID

[75] Inventors: John B. Sardisco, Shreveport, La.; Erhart K. Drechsel, Houston, Tex.

[73] Assignee: Pennzoil Company, Houston, Tex.

[21] Appl. No.: 64,182

[22] Filed: Aug. 6, 1979

[51] Int. Cl.³ ............................................. C01B 7/03
[52] U.S. Cl. ................................. 423/482; 423/341; 423/483; 423/499; 423/551
[58] Field of Search ............... 423/481, 482, 551, 483, 423/341, 552, 499

[56] References Cited

U.S. PATENT DOCUMENTS

| | | | |
|---|---|---|---|
| 1,054,518 | 2/1913 | Doremus | 423/551 X |
| 1,897,996 | 2/1933 | Barstow et al. | 423/488 |
| 1,906,467 | 5/1933 | Heath | 423/481 |
| 2,556,064 | 6/1951 | Caldwell et al. | 423/341 |
| 2,853,363 | 9/1958 | Sidun et al. | 423/341 |
| 2,865,709 | 12/1958 | Horn et al. | 423/341 |
| 3,021,193 | 2/1962 | Cunningham | 423/490 |
| 3,082,061 | 3/1963 | Barry et al. | 423/341 |
| 3,369,863 | 2/1968 | Jones et al. | 423/341 |
| 4,055,626 | 10/1977 | Drechsel et al. | 423/341 X |
| 4,137,063 | 1/1979 | Sardisco | 71/51 |

*Primary Examiner*—Earl C. Thomas
*Attorney, Agent, or Firm*—Lowe, King, Price & Becker

[57] ABSTRACT

Alkali metal fluosilicate is used as an intermediate reactant in a process for the production of hydrochloric acid and an alkali metal sulfate from sulfuric acid and an alkali metal chloride. The process includes the reaction of alkali metal fluosilicate with sulfuric acid to produce alkali metal sulfate and $H_2SiF_6$, the latter being reacted with alkali metal chloride to produce HCl and alkali metal fluosilicate. The resulting hydrochloric acid may be converted to anhydrous hydrogen chloride. A continuous process for the production of hydrochloric acid and of alkali metal sulfate such as potassium sulfate from an alkali metal fluosilicate material is also disclosed.

12 Claims, 1 Drawing Figure

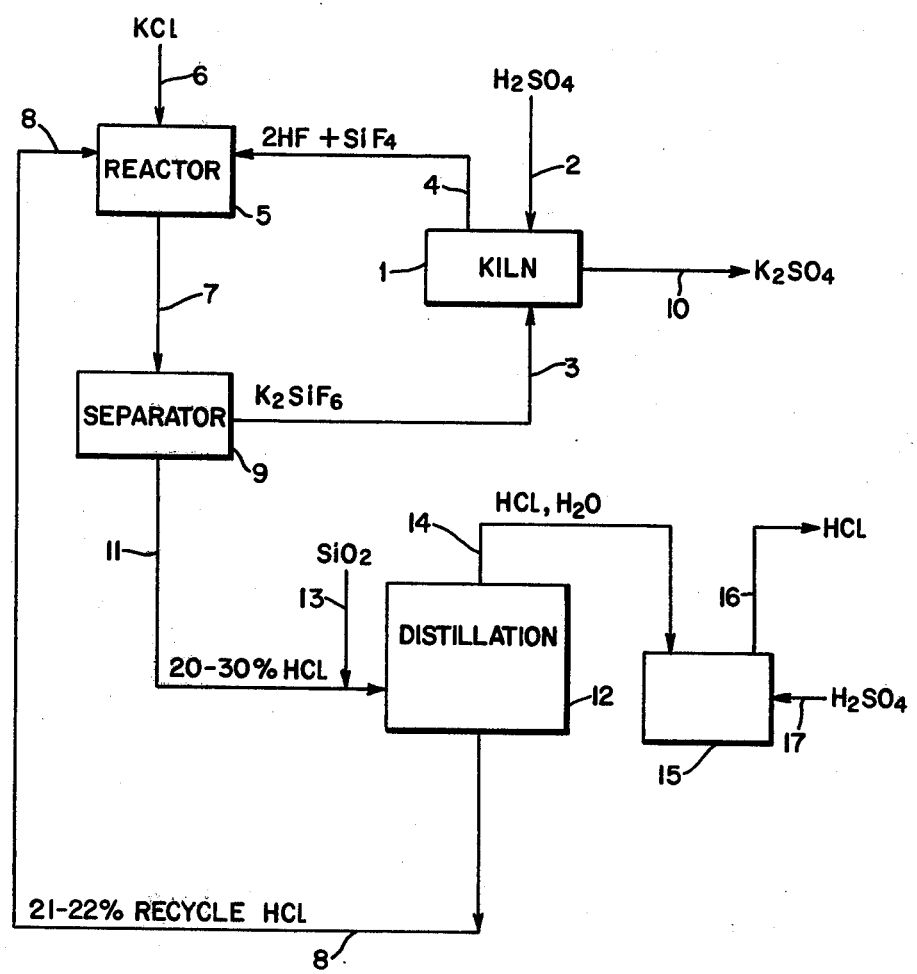

PROCESS FOR PRODUCTION OF POTASSIUM SULFATE AND HYDROCHLORIC ACID

BACKGROUND OF THE INVENTION

1. Field of the Invention

This invention relates to the production of an alkali metal sulfate and HCl by use of an alkali metal fluosilicate as an intermediate reactant in a process for the production of certain useful products. More particularly, the invention relates to a process for the production of an alkali metal sulfate and hydrochloric acid and ultimately of anhydrous hydrogen chloride wherein an alkali metal fluosilicate is employed as a key intermediate reactant.

2. Description of the Prior Art

In the acidulation of fluoride-containing phosphate rock to form materials useful in fertilizers, an alkali metal fluosilicate is often produced as a by-product. The fluosilicate is formed in a process such as that set forth in U.S. Pat. No. 4,055,626, which controls the emission of fluoride-containing gases. This fluosilicate contains useful ions and is of interest in the recovery of valuable products therefrom.

Processes utilizing an alkali metal fluosilicate as a reactant are known. These processes include the use of alkali metal fluosilicates to form potassium sulfate, a commercially useful product. Exemplary of these prior art processes are U.S. Pat. No. 1,054,518 to Doremus and U.S. Pat. No. 3,082,061 to Barry et al. Although both patents generally disclose potassium sulfate formation from potassium fluosilicate by reaction with sulfuric acid, they do not contemplate a reaction sequence which produces hydrochloric acid from the fluosilicate by making use of HF and $SiF_4$ reaction by-products in a novel reaction.

Although it is known in the prior art to form hydrochloric acid from $H_2SiF_6$, the prior art of which we are aware does not use an alkali metal fluosilicate as a reacting material, that is, as the source of $H_2SiF_6$, in the production of hydrochloric acid. Exemplary of these prior art processes are U.S. Pat. No. 3,021,193 to Cunningham and U.S. Pat. No. 3,369,863 to Jones et al. Further, these patents do not contemplate the discovery of applicants for the production of hydrochloric acid from which anhydrous HCl may be recovered.

In U.S. Pat. No. 4,137,063, filed June 24, 1977, in which one of us is an inventor, there is disclosed a process for production of a solid potassium polyphosphate polymer which comprises reacting potassium fluosilicate with a mixture of phosphoric acid and sulfuric acid. The reaction is continued for a sufficient period of time to evolve fluorides in the form of $SiF_4$ and HF. It is a feature of that process that these fluorides may be reacted with a potassium salt such as KCl to form additional potassium fluosilicate which is reused in the process. Also recovered from this latter reaction is KCl and HCl in an aqueous solution from which the HCl may be recovered.

While certain of the reactions of U.S. Pat. No. 4,137,063 are related to the process of this invention, there is not any disclosure in U.S. Pat. No. 4,137,063 for the production of alkali metal sulfate in quantity, together with anhydrous HCl, which are valuable products resulting from the instant process.

SUMMARY OF THE INVENTION

It is accordingly one object of the present invention to provide a process for the production of both an alkali metal sulfate such as potassium sulfate, and hydrochloric acid, both commercially useful products, from an alkali metal fluosilicate intermediate reactant which is formed from alkali metal chloride and sulfuric acid.

A further object of the present invention is to provide a method for the recovery of hydrochloric acid from an alkali metal fluosilicate.

A still further object of the present invention is to provide a novel reaction system for the recovery of hydrochloric acid and alkali metal sulfate.

An even further object of the present invention is to provide a reaction system for the formation of anhydrous hydrogen chloride from an alkali metal fluosilicate intermediate.

Other objects and advantages of the present invention will become apparent as the description thereof proceeds.

In satisfaction of the foregoing objects and advantages, there is provided by this invention in a first embodiment, a process for the production of hydrochloric acid and an alkali metal sulfate by the steps comprising reacting in a first reactor, an alkali metal fluosilicate with sulfuric acid to produce an alkali metal sulfate as one product and a gaseous mixture of HF and $SiF_4$ as a second product; reacting in a second reactor, in the presence of an about 21–22 wt. % aqueous hydrochloric acid solution, a solid alkali metal chloride with the gaseous mixture of HF and $SiF_4$ to form filterable crystals of an alkali metal fluosilicate in a solution of about 20–30 wt. % hydrochloric acid; and recovering the about 20–30 wt. % hydrochloric acid by separating it from the alkali metal fluosilicate. The 20–30 wt. % hydrochloric acid may then be converted to anhydrous hydrogen chloride as by distillation.

Also provided in a second embodiment is a continuous process for the production of hydrochloric acid and an alkali metal sulfate, which process includes the steps of reacting in a first reactor, an alkali metal fluosilicate with sulfuric acid to produce an alkali metal sulfate as a product and a gaseous mixture of HF and $SiF_4$; reacting in a second reactor in the presence of an about 21–22 wt. % aqueous hydrochloric acid solution, a solid alkali metal chloride with the HF/$SiF_4$ gaseous mixture to form filterable crystals of the alkali metal fluosilicate in about 20–30 wt. % hydrochloric acid; separating the resulting alkali metal fluosilicate from the solution of about 20–30 wt. % hydrochloric acid; and returning the fluosilicate to the first reactor for reaction with additional sulfuric acid. In the continuous process, the about 20–30 wt. % hydrochloric acid is converted to anhydrous hydrogen chloride by distillation with regeneration of an about 21–22 wt. % aqueous hydrochloric acid solution and with recycling of this solution to the second reactor. In the continuous process, the alkali metal of the alkali metal fluosilicate intermediate and the alkali metal of the alkali metal chloride are the same, and are preferably $K_2SiF_6$ and KCl.

BRIEF DESCRIPTION OF THE INVENTION

Reference is now made to the drawing accompanying the application which is a flowsheet of the continuous process of the present invention.

DESCRIPTION OF PREFERRED EMBODIMENTS

As indicated above, the present invention is concerned with a process for the production of hydrochloric acid and an alkali metal sulfate, and is concerned with the production of anhydrous hydrogen chloride from the resulting hydrochloric acid. Further, the invention describes a continuous process for the production of hydrochloric acid and an alkali metal sulfate from the basic reactants, sulfuric acid and alkali metal chloride. In the present invention, the preferred alkali metal is potassium with the resultant production of potassium sulfate ($K_2SO_4$) and anhydrous hydrogen chloride through potassium fluosilicate as an intermediate product or reactant.

According to the present invention, potassium sulfate is produced by reacting in a first reactor, potassium fluosilicate with sulfuric acid; and hydrochloric acid of about 20%–30% concentration is produced by reacting in a second reactor, in the presence of an about 21–22 wt. % aqueous hydrochloric acid solution, a solid alkali metal chloride with $H_2SiF_6$ formed from a gaseous mixture of HF and $SiF_4$. This gaseous mixture is produced in the first reactor. Also according to the present invention, anhydrous hydrogen chloride is recovered from the resulting hydrochloric acid.

It has now been found that an alkali metal fluosilicate such as potassium fluosilicate, which has not been known heretofore as a material of substantial utility, can be employed as an intermediate product in a novel reaction sequence for the production of both an alkali metal sulfate such as potassium sulfate, and hydrochloric acid, as well as ultimately of anhydrous hydrogen chloride. It has also been found that hydrochloric acid may be produced by a reaction between $H_2SiF_6$ and an alkali metal chloride in the presence of a hydrochloric acid solution.

An alkali metal fluosilicate such as potassium fluosilicate is a known by-product of the acidulation of fluoride-containing phosphate rock, particularly in processes concerned with controlling the emissions of fluoride-containing compounds. An exemplary process which produces potassium fluosilicate as a by-product is disclosed in U.S. Pat. No. 4,055,626, the disclosure of which is incorporated herein by reference. The alkali metal fluosilicate which is employed as a reactant in the present process is, of course, not limited to one produced as a by-product in the acidulation of fluoride-containing phosphate rock, but rather could be obtained from any source.

The processes of the present invention may be illustrated by the following equations when $K_2SiF_6$ is the reactant:

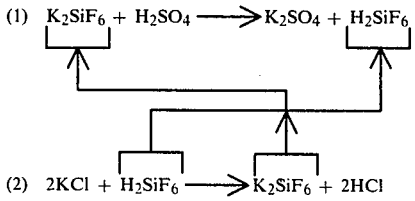

or, to summarize equations (1) and (2):

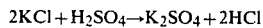   (3)

As will be understood from these equations, both $H_2SiF_6$ and $K_2SiF_6$ are intermediates in the overall production of $K_2SO_4$ and HCl from KCl and $H_2SO_4$, and thus present an alternative and efficient procedure for conducting these processes.

The fluosilicate of any alkali metal is suitable for use in the present process. However, the fluosilicates of sodium and potassium are preferred, with potassium fluosilicate being the most preferred.

In the process of the present invention, the alkali metal fluosilicate, preferably $K_2SiF_6$, produced as an intermediate in the process, is reacted with sulfuric acid to produce an alkali metal sulfate and a gaseous mixture of HF and $SiF_4$. This reaction is carried out in the substantial absence of water, and for this reason, a solid alkali metal fluosilicate and concentrated sulfuric acid are advantageously used. These two reactants are combined in proportions that range from stoichiometric to a slight molar excess of $H_2SO_4$ such as 1.1 mole $H_2SO_4$ to 1.0 mole alkali metal fluosilicate. Optionally, $SiO_2$ is added to the fluosilicate—$H_2SO_4$ reaction mixture in a molar ratio, based upon $K_2SiF_6$, of about 0.50–0.62.

The reaction is conducted at elevated temperatures, with a temperature in the range of about 200°–400° C. being preferred, and thus is carried out in any reactor which will withstand elevated temperatures. A suitable reactor is, for example, a kiln. When a temperature in the range of about 250°–300° C. is selected, it is preferred to add $SiO_2$ to the reaction mixture since there results a greater percent decomposition of alkali metal fluosilicate.

The time required for the reaction, of course, varies according to the temperature selected, with a shorter time being needed when a higher temperature is used. Using a kiln, a suitable reaction time is in the range of about 2 to 24 hours, and is preferably about 2 to 12 hours. In the laboratory runs of Examples I–VIII, a granulator was used to simulate use of a kiln. In these runs, a long reaction time of about 24 hours was required.

From this reaction, there is produced a mixture of fluorides as HF and $SiF_4$. This gaseous mixture is drawn off from the reactor, leaving behind an alkali metal sulfate, preferably $K_2SO_4$, which is a desired and useful end product of the present process. Thus, this step provides both an intermediate reactant and a useful product, the alkali metal sulfate.

The gaseous mixture of HF and $SiF_4$ ($H_2SiF_6$) is conveyed to a second reactor where it is reacted with a solid alkali metal chloride, in the presence of an about 21–22 wt. % aqueous hydrochloric acid solution, to form about 20–30 wt. % or preferably about 30 wt. % HCl. Alkali metal fluosilicate is produced as a by-product.

An aqueous solution of about 21–22 wt. % hydrochloric acid is required for use in this step, with a solution of about 21 wt. % HCl being preferred. The hydrochloric acid produced from this reaction is an aqueous solution having a concentration of about 20–30 wt. % of hydrochloric acid, preferably of about 30 wt. % HCl.

The alkali metal of the alkali metal chloride may be any alkali metal, with sodium and potassium being preferred, and with potassium being the most preferred. This alkali metal may be the same as or different from the alkali metal of the alkali metal fluosilicate intermediate. KCl is the preferred reactant.

This step is suitably conducted at a temperature of from about room temperature to about 70° C., with a preferable temperature being in the range of 40°–60° C. A temperature of about 50° C. is very preferred.

The $H_2SiF_6$ and alkali metal chloride react to form gaseous HCl with a resulting change in the concentration of the about 21–22 % HCl solution. It is preferred that about two moles of alkali metal chloride be added for reaction with about one mole of $H_2SiF_6$, with an exact 2:1 ratio being very preferred.

From this reaction there is produced an alkali metal fluosilicate and about 20–30 wt. % hydrochloric acid. The reaction of this step is continued for a sufficient time to form filterable crystals of the alkali metal fluosilicate. The reaction time, of coure, varies with the temperature selected, with a shorter time being needed when a temperature approaching the upper portion of the range is used. A reaction time of three to four hours is preferable when a temperature of about 50° C. is used, since this insures that more than 80% of the fluosilicate crystals are in the solid state.

To obtain the about 20–30 wt. % hydrochloric acid, the HF and $SiF_4$ are supplied in the gaseous form to the second step of the process, and the combination reaction of gaseous HF and $SiF_4$, a solid alkali metal chloride, and an about 21–22% hydrochloric acid solution is believed critical to obtaining the resulting solution containing about 20–30 wt. % HCl.

This reaction produces a slurry of an alkali metal fluosilicate in about 20–30 wt. % HCl. The fluosilicate and the acid are separated, with filtration being a suitable means. Upon separation, the about 20–30 wt. % HCl contains about 0.1 to 0.3 wt. % of fluosilicate and about 1–3 wt. % of alkali metal chloride.

The fluosilicate which is recovered, is of high purity and is suitable for further reactions. Preferably, the alkali metal of the alkali metal chloride is the same as the alkali metal of the fluosilicate starting material, so that the fluosilicate obtained may be recycled to the first reactor, for reaction with additional sulfuric acid.

From the above, it may be seen that the present process provides a unique sequence for the production of an alkali metal sulfate and about 20–30 wt. % hydrochloric acid from an alkali metal fluosilicate.

As a further feature of the invention, the about 20–30 wt. % HCl is converted to anhydrous HCl. Advantageously, this conversion is carried out by a procedure which includes a distillation step as the first step. An example of a suitable procedure is set forth below. The distillation step regenerates an about 21–22 wt. % hydrochloric acid solution.

Prior to the distillation step, it is desirable to add an agent for suppressing excessive emission of fluoride-containing gases during distillation. Preferred agents of this type include $SiO_2$ in the form of silica gel. About 1 to 5 wt. % of this agent is preferably employed based on the weight of the solution being treated.

Additionally, it may be necessary to dry the product of the distillation step with $H_2SO_4$, in order to produce the anhydrous HCl. This procedure is well known in the art.

As pointed out above, the present invention also provides a continuous process, in which the alkali metal of the alkali metal chloride used must be the same as the alkali metal of the alkali metal fluosilicate used in the first reaction so that the fluosilicate starting material is regenerated, and the regenerated fluosilicate is recycled. Additionally, it is preferred in the continuous process to convert the about 20–30 wt. % HCl to anhydrous HCl. The conversion procedure is identical to that described above, with the distillation regenerating an about 21–22 wt. % HCl solution. Although the regenerated hydrochloric acid solution does not need to have exactly the same concentration of hydrochloric acid as the solution fed into the second reactor, this solution will have an HCl concentration which is controlled by the azeotrope formed by distillation of the HCl solution. The azeotrope always produces an HCl aqueous solution having a concentration of about 21 wt. %.

Reference is now made to the drawing accompanying the application which illustrates a preferred continuous process for the invention.

In the process of the drawing sulfuric acid from line 2 and intermediate $K_2SiF_6$ from line 3 are reacted in a reactor such as kiln 1 at a temperature of about 200° to 400° C. to produce $K_2SO_4$ which is recovered from line 10. Also produced in the reaction is a gaseous mixture of $2HF + SiF_4$ in line 4 which is passed together with wash water from washing of the $K_2SO_4$, to reactor 5, the latter maintained at a temperature of about 40° to 60° C.

In reactor 5, which is preferably a scrubber, the gaseous mixture of $2HF + SiF_4$, and water, are reacted with KCl from line 6, and a recycle 21–22 wt. % aqueous HCl solution from line 8. The aqueous HCl solution will also contain about 6 to 8 wt. % KCl and 0.3% to 0.7% $K_2SiF_6$ in the mixture.

The reaction product from reactor 5 is withdrawn via line 7 to separator 9, preferably a filter, where $K_2SiF_6$ product is removed and passed by line 3 for reaction with sulfuric acid. The filtrate from separator 9 comprises an aqueous solution of HCl having a concentration of about 20% to 30% by weight, together with 0.1% to 0.3 wt. % $K_2SiF_6$, and about 1–3 wt. % KCl.

This latter solution is withdrawn by line 11 and passed to distillation tower 12. Prior to passing to distillation, the solution in line 11 can be treated with about 3 wt. % silicon dioxide, based on the total weight of the solution. The silicon dioxide is an optional additive to suppress fluorides in the solution by reacting therewith to form $K_2SiF_6$.

Distillation tower 12 may be a multistage still in which anhydrous HCl could be recovered. However, preferably, an $HCl/H_2O$ azeotrope is distilled off by line 14 to still 15 from which anhydrous HCl can be recovered at 16. Sulfuric acid can be added by line 17 as a dehydrating agent.

From distillation tower 12, recycle HCl solution is recovered by line 8 for recycle to reactor 5. This HCl solution contains a concentration of about 21–22 wt. % HCl which is the concentration formed as a result of the azeotrope distillation. The solution also contains about 6–8 wt. % KCl and 0.3 to 0.7 wt. % $K_2SiF_6$, both of which are suitable for recycle.

Specific examples of the step forming the anhydrous HCl and of the process will now be set forth. Unless otherwise indicated, all percentages are by weight. It will be understood that these examples are merely illustrative and in no way are to be interpreted as limiting the scope of the invention.

EXAMPLE I

In a granulator maintained at a temperature of 200° C., $K_2SiF_6$, produced in a later step, is reacted with concentrated sulfuric acid in a mole ratio of 1.1:1.0 of sulfuric acid to $K_2SiF_6$. The reaction is conducted for 24 hours, a gaseous mixture of HF and $SiF_4$ is drawn off from the reactor, and potassium sulfate solid product is recovered and washed with water. The percent decomposition of $K_2SiF_6$ is 71%.

EXAMPLE II

The procedure of Example I is followed except that there is added to the reaction mixture 0.50 mole based upon moles $K_2SiF_6$, of $SiO_2$. There is obtained a 68% decomposition of $K_2SiF_6$.

EXAMPLE III

The procedure of Example I is followed except that the granulator is maintained at a temperature of 250° C. There is obtained an 81% decomposition of $K_2SiF_6$.

EXAMPLE IV

The procedure of Example III is followed except that there is added to the reaction mixture 0.52 mole, based upon $K_2SiF_6$, of $SiO_2$. There results a 93% decomposition of $K_2SiF_6$.

EXAMPLE V

In a granulator maintained at a temperature of 250° C., $K_2SiF_6$, produced in a later step, is reacted with a stoichiometrically equal amount, based upon moles, of concentrated sulfuric acid. The reaction is conducted for 24 hours, a gaseous mixture of HF and $SiF_4$ is drawn off from the reactor, and potassium sulfate solid product is recovered and washed with water. There is obtained 80% decomposition of $K_2SiF_6$.

EXAMPLE VI

The procedure of Example II is followed except that the granulator is maintained at a temperature of 300° C. There is obtained a 96% decomposition of $K_2SiF_6$.

EXAMPLE VII

The procedure of Example V is followed except that the granulator is maintained at a temperature of 300° C. and 0.62 mole, rather than 0.50 mole, of $SiO_2$ is used. An 89% decomposition of $K_2SiF_6$ is produced.

EXAMPLE VIII

The procedure of Example VII is followed except that there is not added to the reaction mixture any $SiO_2$. There is obtained an 85% decomposition of $K_2SiF_6$.

EXAMPLE IX

A gaseous stream of HF and $SIF_4$ produced by sulfuric acid decomposition of $K_2SiF_6$ is conveyed to a scrubber maintained at a temperature of 60° C. There is used as a scrubbing liquor in the scrubber a solution containing 21.0% HCl, 7% KCl and 0.6% $K_2SiF_6$, recovered in a subsequent step. To the scrubber, KCl is added in an amount that is stoichiometrically equal on a molar basis to the $H_2SiF_6$. After the reaction proceeds for 2 hours, the mixture is cooled and then filtered to yield solid potassium fluosilicate and a 24 wt. % solution of HCl containing 0.2% $K_2SiF_6$ and 2% KCl. The fluosilicate is removed from the reaction and recycled for reaction with $H_2SO_4$, and the solution of HCl is conveyed to a distillation tower. Prior to the distillation, there is added to the HCl solution, 3% silica gel to suppress fluorine. The distillation is carried out under atmospheric pressure using an external source of heat. The distillate is collected in three successive fractions with relatively anhydrous HCl being collected at 70°–100° C., with a middle fraction being collected at 100°–108° C., and finally with a constant boiling fraction having a boiling point of 108.7° C. at 762 mm Hg then being collected. The relatively anhydrous HCl fraction contains 98.9% HCl. The constant boiling fraction has an hydrochloric acid concentration of 21%. The relatively anhydrous HCl fraction is then conveyed to a dryer where it is converted by contact with concentrated sulfuric acid for 4 hours to anhydrous hydrogen chloride.

The residue from the distillation is a 21 wt. % solution of HCl containing 7 wt. % KCl and 0.6 wt. % $K_2SiF_6$, which is recycled to the scrubber for reaction with the gaseous mixture of 2 HF+$SiF_4$ and KCl, in producing addition $K_2SiF_6$.

EXAMPLE X

To a solution of 29% HCl, a 1% KCl and 0.2% $K_2SiF_6$, there is added 3% silica gel to suppress fluorine. This solution is conveyed to a distillation tower and heated externally under atmospheric pressure. The distillate is collected in three successive fractions with relatively anhydrous HCl being collected at 70°–100° C. This first fraction is characterized by 86.14% chloride ion. A middle fraction boiling at 100°–108° C. is then collected, followed by a constant boiling fraction having a boiling point of 108.7° C. at 762 mm Hg, and having an HCl concentration of 20.6%.

What is claimed is:

1. A process for the production of about 20–30 wt. % hydrochloric acid and alkali metal sulfate comprising
reacting an alkali metal fluosilicate with sulfuric acid at 250°–300° C. in the presence of $SiO_2$, to produce an alkali metal sulfate as a product and to form a gaseous mixture of HF and $SiF_4$; said $SiO_2$ being present in a molar ratio of about 0.50–0.62, based upon the alkali metal fluosilicate;
reacting in a second reactor, the gaseous mixture with about 21–22 wt. % aqueous HCl solution, and a solid alkali metal chloride to form filterable crystals of an alkali metal fluosilicate in about 20–30 wt. % hydrochloric acid; and
recovering the about 20–30 wt. % hydrochloric acid by separating the alkali metal fluosilicate from the about 20–30 wt. % hydrochloric acid, and recycling the alkali metal fluosilicate for reaction with sulfuric acid, wherein the alkali metal in the fluosilicate and alkali metal chloride are the same.

2. A process for producing anhydrous hydrogen chloride from the about 20–30 wt. % hydrochloric acid produced in accordance with the process of claim 1, said process comprising distilling the about 20–30 wt. % hydrochloric acid whereby anhydrous hydrogen chloride is formed as a product and an about 21–22 wt. % aqueous HCl solution is regenerated, said HCl solution being recycled to said second reactor.

3. The process of claim 2 wherein a small amount of silicon dioxide for suppressing excessive emission of fluoride-containing gases is added to the hydrochloric acid prior to the distillation step.

4. The process of claim 1 wherein the alkali metal of the alkali metal fluosilicate is potassium, and wherein the alkali metal sulfate product is potassium sulfate.

5. The process of claim 1 wherein the alkali metal of the alkali metal chloride is potassium.

6. The process of claim 1 wherein the reaction in the second reactor is at a temperature in the range of about 40° to 60° C.

7. The process of claim 1, wherein about two moles of the alkali metal chloride are added for reaction with about one mole of the gaseous mixture.

8. The process of claim 6, wherein the reaction in the second reactor is at a temperature of about 50° C. and the reaction time is 3-4 hours.

9. A continuous process for the production of anhydrous hydrogen chloride and of potassium sulfate comprising the steps of:

reacting potassium fluosilicate with sulfuric acid at 250°-300° C. in the presence of $SiO_2$, to produce potassium sulfate as a product and to form a gaseous mixture of HF and $SiF_4$; said $SiO_2$ being present in a molar ratio of about 0.50-0.62, based upon the potassium fluosilicate;

reacting the gaseous mixture with a solution of about 21-22 wt. % aqueous HCl, and solid potassium chloride to form filterable crystals of said potassium fluosilicate in about 20-30 wt. % hydrochloric acid;

obtaining the about 20-30 wt. % hydrochloric acid by separating the potassium fluosilicate from the about 20-30 wt. % hydrochloric acid;

recycling the potassium fluosilicate for reaction with additional sulfuric acid; and distilling the about 20-30 wt. % HCl whereby anhydrous hydrogen chloride is formed as a product and an about 21-22 wt. % aqueous HCl solution is regenerated, and recycling the regenerated HCl solution for reaction with said gaseous mixture and solid potassium chloride.

10. The process of claim 9 wherein the reaction of said gaseous mixture, potassium chloride and 20-21 wt. % aqueous HCl solution, is in the range of about 40° to 60° C.

11. The process of claim 9, wherein about two moles of potassium chloride are added for reaction with about one mole of the gaseous mixture.

12. The process of claim 10, wherein the reaction in the second reactor is at a temperature of about 50° C. and the reaction time is 3-4 hours.

* * * * *